US009760956B2

(12) United States Patent
Magnussen et al.

(10) Patent No.: US 9,760,956 B2
(45) Date of Patent: Sep. 12, 2017

(54) OPTIMIZED LOAD MANAGEMENT (71) Applicant: SMA Solar Technology AG, Niestetal (DE)

(72) Inventors: Bjoern Magnussen, Kassel (DE); Christian Hoehle, Fuerstenberg (DE); Raimund Thiel, Bad Zwesten (DE)

(73) Assignee: SMA Solar Technology AG, Niestetal (DE)

( * ) Notice: Subject to any disclaimer, the term of this patent is extended or adjusted under 35 U.S.C. 154(b) by 676 days.

(21) Appl. No.: 14/048,096

(22) Filed: Oct. 8, 2013

(65) Prior Publication Data
US 2014/0046495 A1 Feb. 13, 2014

Related U.S. Application Data (63) Continuation-in-part of application No. PCT/EP2012/056391, filed on Apr. 10, 2012, which
(Continued)

(30) Foreign Application Priority Data

Apr. 8, 2011 (DE) .................. 10 2011 001 918

(51) Int. Cl.
*G06Q 50/06* (2012.01)
*H02J 3/14* (2006.01)
(Continued)

(52) U.S. Cl.
CPC .............. *G06Q 50/06* (2013.01); *H02J 3/14* (2013.01); *H02J 3/32* (2013.01); *H02J 3/383* (2013.01);
(Continued)

(58) Field of Classification Search
CPC ............... G06Q 50/06; H02J 2003/007; H02J 2003/143; H02J 3/14; H02J 3/32;
(Continued)

(56) References Cited

U.S. PATENT DOCUMENTS 4,245,319 A * 1/1981 Hedges ................. H02J 3/14
307/129
4,620,283 A 10/1986 Butt et al.
(Continued)

FOREIGN PATENT DOCUMENTS

DE 4425876 A1 1/1996
DE 202008009128 U1 1/2009
(Continued)

OTHER PUBLICATIONS

Matics, Jens: "Operational Modelling, Design and Management of Decentralized Energy Systems", PhD Thesis, Jun. 2007.
(Continued)

*Primary Examiner* — Christopher E Everett
*Assistant Examiner* — Yuhui R Pan
(74) *Attorney, Agent, or Firm* — Eshweiler & Associates, LLC (57) ABSTRACT

For optimizing a chronological development of consumption of electric power by a group of different consumers with regard to a supply of electric power including electric power from at least one wind or solar power generator, characteristic time curves of the consumption of electric power are determined at a high temporal resolution. A prognosis is made of a chronological development of the supply of electric power from the at least one power generator for a future period of time, and a plan for apportioning electric power to the individual consumers within the future period of time is made based on the characteristic time curves of the consumption of electric power by the individual consumers,
(Continued)

the prognosis, and user goal setting by a user of the consumers resulting in different weightings of consumption of electric power by different consumers and supply of electric power by different power sources.

28 Claims, 4 Drawing Sheets

Related U.S. Application Data is a continuation-in-part of application No. PCT/EP2012/056423, filed on Apr. 10, 2012.

(51) Int. Cl.
H02J 3/32 (2006.01)
H02J 3/38 (2006.01)
H02J 3/00 (2006.01)

(52) U.S. Cl.
CPC ......... H02J 3/386 (2013.01); H02J 2003/007 (2013.01); H02J 2003/143 (2013.01); Y02B 70/3225 (2013.01); Y02B 70/3266 (2013.01); Y02E 10/563 (2013.01); Y02E 10/566 (2013.01); Y02E 10/763 (2013.01); Y04S 20/222 (2013.01); Y04S 20/242 (2013.01)

(58) Field of Classification Search
CPC ....... H02J 3/383; H02J 3/386; Y02B 70/3225; Y02B 70/3266; Y02E 10/563; Y02E 10/566; Y02E 10/763; Y04S 20/222; Y04S 20/242
USPC ........................................................ 700/291
See application file for complete search history.

(56) References Cited

U.S. PATENT DOCUMENTS

| | | | |
|---|---|---|---|
| 5,736,847 A | 4/1998 | Van Doorn et al. | |
| 6,246,034 B1* | 6/2001 | Glaser ................. | H02M 5/2576 219/485 |
| 6,633,823 B2 | 10/2003 | Bartone et al. | |
| 6,697,951 B1 | 2/2004 | Sinha et al. | |
| 9,250,101 B2* | 2/2016 | Davies ..................... | G01D 4/00 |
| 2003/0036820 A1 | 2/2003 | Yellepeddy et al. | |
| 2004/0196604 A1* | 10/2004 | Matsumoto ............... | H02J 3/26 361/62 |
| 2006/0276938 A1* | 12/2006 | Miller .................... | G06Q 50/06 700/295 |
| 2009/0003266 A1* | 1/2009 | Stolyar ................. | H04W 16/10 370/328 |
| 2010/0141046 A1 | 6/2010 | Paik | |
| 2011/0040785 A1* | 2/2011 | Steenberg .......... | G05B 23/0235 707/769 |
| 2011/0046805 A1* | 2/2011 | Bedros ................ | H04L 12/2809 700/291 |
| 2011/0118890 A1* | 5/2011 | Parsons ..................... | H02J 3/14 700/295 |
| 2011/0307112 A1* | 12/2011 | Barrilleaux ............ | H05B 37/02 700/291 |
| 2012/0001844 A1* | 1/2012 | Auguste ................ | G06F 1/1632 345/156 |
| 2012/0283890 A1* | 11/2012 | Fu ............................ | H02J 3/14 700/295 |

FOREIGN PATENT DOCUMENTS

| | | |
|---|---|---|
| DE | 102008037575 A1 | 7/2010 |
| DE | 102009010117 A1 | 9/2010 |
| DE | 202010015254 U1 | 1/2011 |
| DE | 102009035399 A1 | 2/2011 |
| EP | 0053383 A1 | 6/1982 |
| EP | 0161447 B1 | 3/1985 |
| EP | 0053383 B1 | 6/1985 |
| EP | 0161447 A1 | 11/1985 |
| EP | 1263108 A1 | 12/2002 |
| EP | 2200143 A2 | 6/2010 |
| EP | 2355294 A2 | 8/2011 |
| JP | 2003173808 A | 6/2003 |
| JP | 2004328940 A | 11/2004 |
| JP | 2005006414 A | 1/2005 |
| JP | 2006353079 A | 12/2006 |
| JP | 2007228742 A | 9/2007 |
| JP | 2007295680 A | 11/2007 |
| WO | 2010057947 A2 | 5/2010 |
| WO | 2010118332 A1 | 10/2010 |
| WO | 2011012272 A2 | 2/2011 |
| WO | 2012136843 A1 | 10/2012 |
| WO | 2012171592 A2 | 12/2012 |

OTHER PUBLICATIONS

Verweyen, Dr. Norbert: "Networking of Smart Meter and Smart Home", MCC Smart Energy2010, Oct. 2010.
Beckhaus, Peter: "Simulation and Plant Management for Decentralized Energy Supply Systems", PhD Thesis, Apr. 2002.
Ikegami, Takashi et al.: "Optimum Operation Scheduling Model of Domestic Electric Appliances for Balancing Power Supply and Demand", International Conference on Power System Technology, 2010.
Laskowski, Prof. Dr. Michael: "Smart Grid made in Germany", E-DeMa—E-Energy Modellregion, Apr. 2011.
Korbik, Arkadiusz et al.: "Enabling Active Distribution Networks Through Decentralised Autonomous Network Management", 18th International Conference on Electricity Distribution, Jun. 2005.
WEY PV: "Photovoltaic Fire Shutdown—PFA—Photovoltaik-Feuerwehr-Abschaltung" Published in Dec. of 2010. Hof/Westerwald 2010 Company Publication. Retrieved from: www.weypv.de/downloads/weypv_flyer_pfa_12-2010.pdf 5 Pages.
International Search Report dated Jul. 17, 2012 for International Application No. PCT/EP2012/056391. 2 Pages.
International Search Report dated Aug. 2, 2012 for International Application No. PCT/EP2012/056423. 3 Pages.

* cited by examiner

OPTIMIZED LOAD MANAGEMENT

CROSS-REFERENCE TO RELATED APPLICATIONS

This application is a Continuation-in-Part of International Application number PCT/EP2012/056391 filed on Apr. 10, 2012 & International Application number PCT/EP2012/056423 filed on Apr. 10, 2012, which claim priority to German Application number 10 2011 001 918.9 filed on Apr. 8, 2011.

FIELD

The present disclosure generally relates to a method and an apparatus for optimizing a chronological development of consumption of electric energy by a group of different consumers with regard to a supply of electric power which includes electric power from at least one wind or solar power generator as well as electric power which is bi-directionally exchanged with a storage for electric energy and/or a public power grid.

The different consumers and the at least one wind or solar power generator are typically located within a local power grid. This local power grid may either be an island grid or it may comprise a connection to a public power grid. The term consumer here refers to an electric load.

BACKGROUND OF THE DISCLOSURE

Electric power from solar and wind power generators is not necessarily available at the same time when a need of electric power is present in a public power grid to which the power generators are connected. Rather, the supply of high electric power by the power generators, like for example by solar power generators at noon time, may coincide with a surplus of electric power already present in the connected public power grid. This may have the result that the output power of the power generators has to be curtailed and thus electric power gets lost which would be available at no additional cost.

If in a local power grid comprising a power generator more electric power is produced than consumed and the excess electric power is fed into a public power grid at one time, whereas more electric power is consumed than produced and the missing electric power is taken of the public power grid at another time, the public power grid essentially serves as a buffer for electric power. This buffer capability causes considerable cost to the operator of the public power grid for which he will ask for compensation.

By now, the supply price of electric energy already extremely depends on the point in time at which the electric energy is supplied. Power tariffs depending on the supply time will thus more and more also be offered to private consumers.

Against this background, a load management is desirable which is optimized with regard to the supply of electric power actually present and which fulfills the aims of a high local consumption of electric power at the location where the electric power is produced by solar or wind generators, i.e. achieving a minimum utilization of a connected public power grid.

A method and an apparatus for optimizing a chronological development of consumption of electric power by a group of different consumers with regard to a supply of electric power which includes electric power from at least one wind or solar generator and a local power grid including such an apparatus are known from DE 10 2008 037 575 A1. By means of a computer based method, the operation of consumers and energy sources of a local system are monitored, controlled and optimized. Solar and/or wind power generators belong to the local system as stationary power sources. Part of the known computer based method is making a plan for an optimized utilization of energy in the local system based on information which includes the prospective overall power consumption by the consumers and the prospective power supply by stationary power sources at future points in time. The prospective overall power consumption at the future points in time is calculated from the measured power consumption of one or several of the consumers. For calculating the power which is supplied by the stationary power sources at the future points in time, the prospective environmental conditions at these points in time are considered. In the diagrams of DE 10 2008 037 575 A1, the power consumption is plotted in blocks covering a duration of 40 minutes, and changes of the power consumption do not occur earlier than after two hours.

A method of optimizing a chronological development of consumption of electric power by a group of different consumers with regard to a supply of electric power which includes electric power from at least one wind or solar power generator is also known from DE 10 2009 010 117 A1. The aim here is to level the electric power consumed by a group of different loads. In a first step, an uncontrolled consumption of power is determined over a defined period of time related to the calendar. In a second step, an average value is calculated from this uncontrolled consumption of power which is used as a preset target value during a similar future period of time. Different priorities are assigned to the consumers, and the consumers are operated according to their priority so that their presently consumed overall electric power does not exceed the target value. With this method, the consumption of electric power may be levelled, and this may, depending on tariff conditions, be economically advantageous for the operator of the local power grid. In the known method, maximum switch-off periods of individual loads, like for example a heat pump for heating a building are registered. Heat or cold generating consumers are purposefully operated during low load periods, so as to store heat or cold for succeeding high load periods in which these consumers are preferably not additionally operated. The operation of dishwashers and washing machines shall preferably also take place during low load periods. Thus, a low priority is assigned to such consumers. On the other hand, consumers like lamps or stoves get a high priority as the need of light or cooking energy depends on momentary desires to an extremely high extent. Further, it is considered that the power consumed by individual consumers varies depending on the progress of their operation cycles. Considering, for example, a washing machine, once switched on it will be in operation for up to two hours and more. The power demanded by the washing machine is comparatively high when water is heated up to a preset washing temperature. For subsequently moving the washing drum, however, only little power is needed. The present consumption of electric energy is measured at intervals of 1, 3 or 5 minutes in the known method. These intervals of time are adapted to a price calculation period of 15 minutes for which an average consumption value is transferred to the operator of the connected public power grid. The price to be paid for the power consumed is calculated based on these average consumption values. In the known method, a local generation of power by solar or wind power generators is considered. If the locally generated power is higher than the locally consumed power, the excess or surplus power is fed into the connected public power grid. Vice versa, missing power is taken from the public power grid.

So-called intelligent electrical sockets for connecting electric consumers are known from DE 44 25 876 A1. The consumers are controlled, i.e. they are switched on, switched off and/or dimmed, via a BUS system which uses the power mains as a transmission medium. Via an additional interface connector, sensors may be connected to the intelligent electric socket and interrogated via the BUS system.

An analyzing apparatus for current consumers in which at least one consumer comprises a unit which is suited for identifying the power consumption of exactly this one consumer and to provide it as information is known from DE 20 2008 009 128 U1. The analyzing apparatus comprises a receiver for the information provided by the at least one consumer. This receiver is suited for separately recording, processing and calculating results according to predetermined algorithms from information from each of the consumers upon switching on and/or switching off the consumers individually. The information transmission takes place via the power supply lines at more than 50 Hz, preferably more than 100 Hz, i.e. at more than 50 b/s or more than 100 b/s. The analyzing apparatus may determine and output the individual power consumption of each consumer and reduce the power supply to this current consumer or switch it on and off. In the known analyzing apparatus, the individual identification of the individual consumers is achieved by means of their individual consumption behaviour. Thus, inductive and capacitive consumption patterns of each consumer, in a figurative sense, comprise the properties of a finger print. This electric finger print consists of a switch-on current pulse and of harmonic waves imprinted in the local power grid. If these harmonic waves are analyzed, it is—due to their individual composition—possible to identify the causing consumer. Thus, by means of an identification of the individual consumption behaviour of the respective consumer, on the one hand, its identification is possible, and, on the other hand, it is possible to make statements on the present status of each individual consumer by comparing its present individual consumption behaviour with a stored nominal value or with a tolerated range of nominal values.

There still is a need for a method of optimizing a chronological development of consumption of electric power by a group a different consumers with regard to a supply of electric power which includes electric power from at least one wind or solar power generator as well as electric power which is bi-directionally exchanged with a storage for electric energy and/or a public power grid, by which a consumption of electric power is optimized according to the different desires of a user of the consumers but always in a technically defined way. This optimization may be an optimization with regard to a local use of the electric power from the power generator such that a connected public power grid is only utilized to a minimum extent and ideally not needed at all. The optimization may alternatively or additionally also be made with regard to one or several other criteria, like for example a maximum usage of electric power from regenerative power sources, an ecologically sensible power consumption or low energy cost.

SUMMARY

The disclosure provides a method of optimizing a chronological development of consumption of electric power by a group of different consumers with regard to a supply of electric power including electric power from at least one wind or solar power generator. The method comprises measuring a consumption of electric power by the individual consumer at a sample rate of at least 0.1 Hz, determining characteristic time curves of the consumption of electric power by the individual consumers, and making a prognosis of a chronological development of the supply of electric power from the at least one power generator for a future period of time. The method further comprises making a plan for apportioning electric power to the individual consumers within the future period of time based on the characteristic time curves of the consumption of electric power by the individual consumers and adapted to the prognosis, and apportioning electric power to the individual consumers according to the plan within the future period of time.

Further, the disclosure provides an apparatus for optimizing the chronological development of consumption of electric power by a group of different consumers with regard to a supply of electric power including electric power from at least one wind or solar power generator. The apparatus comprises measurement devices that are configured to measure the consumption of electric power by the individual consumers at a sample rate of at least 0.1 Hz, and a central controller for apportioning electric power to the individual consumers. The central controller is configured to determine characteristic time curves of the consumption of electric power by the individual consumers, and make a prognosis of a chronological development of the supply of electric power from the at least one power generator for a future period of time. The central controller is further configured to make a plan for apportioning electric power to the individual consumers within the future period of time based on the characteristic time curves of the consumption of electric power by the individual consumers and adapted to the prognosis, and apportion electric power to the individual consumers according to the plan within the future period of time.

Further, the disclosure provides a method of optimizing a chronological development of consumption of electric power by a group of different consumers with regard to a supply of electric power by different power sources including at least one wind or solar power generator and at least one of a storage for electric energy and a public power grid which allow for a bi-directional exchange of electric power. This method comprises: (i) measuring a consumption of electric power by the individual consumers, (ii) determining characteristic time curves of the consumption of electric power by the individual consumers, and (iii) making a prognosis of a chronological development of the supply of electric power from the at least one power generator for a future period of time. The method further comprises: (iv) making a plan for apportioning electric power to the individual consumers within the future period of time, (v) apportioning electric power to the individual consumers according to the plan within the future period of time, and (vi) updating (e.g., continuously) the plan based on an actual supply of electric power by the at least one power generator and an actual consumption of electric power by the individual consumers. The plan is made based on: the prognosis, the characteristic time curves of the consumption of electric power by the individual consumers, the conditions of the bi-directional exchange of electric power with the at least one of the storage for electric energy and the public power grid, and at least one user goal setting set by a user of the consumers and resulting in different weightings of at least one of consumption of electric power by the different consumers and supply of electric power by the different power sources within the future period of time.

Further, the disclosure provides an apparatus for optimizing a temporal development of consumption of electric power by a group of different consumers with regard to a supply of electric power by different power sources including at least one wind or solar power generator and at least one of a storage for electric energy and a public power grid which allow for a bidirectional exchange of electric power. This apparatus comprises a central controller configured to: (i) measure a consumption of electric power by the individual consumers, (ii) determine characteristic time curves of the consumption of electric power by the individual consumers, and (iii) make a prognosis of a chronological development of the supply of electric power from the at least one power generator for a future period of time. The central controller is further configured to: (iv) make a plan for apportioning electric power to the individual consumers within the future period of time, (v) apportion electric power to the individual consumers according to the plan within the future period of time, and (vi) update (e.g., continuously) the plan based on an actual supply of electric power by the at least one power generator and an actual consumption of electric power by the individual consumers. As in the corresponding method, the plan is made based on: the prognosis, the characteristic time curves of the consumption of electric power by the individual consumers, the conditions of the bi-directional exchange of electric power with the at least one of the storage for electric energy and the public power grid, and at least one user goal setting set by a user of the consumers and resulting in different weightings of at least one of consumption of electric power by the different consumers and supply of electric power by the different power sources within the future period of time.

BRIEF DESCRIPTION OF THE DRAWINGS

In the following, the disclosure is further explained and described with reference to example embodiments illustrated in the drawings.

DETAILED DESCRIPTION

In the method of optimizing a chronological development of consumption of electric power by a group of different consumers with regard to a supply of electric power which includes electric power from at least one wind or solar power generator as well as electric power which is bi-directionally exchanged with a storage for electric energy and/or a public power grid, at first a consumption of electric power is measured to determine characteristic time curves of the consumption of electric power by the individual consumers. Then, a prognosis is made of a chronological development of the supply of electric power from the at least one power generator for a period of time in the future. In case of a power generator being a solar power generator, for example, the typical future period of time will be a day. It may, however, also be a part of a day or a plurality of days.

Based on (a) the characteristic time curves of the consumption of electric power by the individual consumers, (b) the prognosis, (c) the conditions of the bi-directional exchange of electric power with the storage for electric energy and/or the public power grid as well as (d) at least one user goal setting set by a user of the consumers and resulting in different weightings of the consumption of electric power by different consumers and/or of the supply of electric power by different sources within the future period of time, a plan for apportioning electric power to the individual consumers within the future period of time is made which is matched to the prognosis. Additionally, this plan is continuously updated based on the actual supply of electric power by the at least one power generator and an actual consumption of electric power.

Within the future period of time electric power is then apportioned to the individual consumers according to that plan. This apportionment corresponds to a rationing of electric power which may be consumed by the individual consumers. This rationing may be binary, i.e. accomplished by turning on or off the electric power supplied to the individual consumers within certain partial intervals of time, wherein the power actually consumed by the individual consumers is determined by the consumers themselves. Alternatively, the rationing to the individual consumers may also be limited in its height so that only a limited power is available to the individual consumers within certain partial intervals of time. Further, the consumers may be brought to limit their power consumption themselves if they have communication and control devices which are suitable for this purpose.

In order to effectively achieve a high local consumption without needing to resort to a connected public power grid by means of making the plan, the consumption of electric power is measured at a sample rate of at least 0.1 Hz in this embodiment. This consumption may be the total consumption of all consumers in a local power grid and/or include the consumptions individually measured for individual consumers. This means that at least about every 10 seconds, for example, at least every second, at least every tenth of a second, or at least every hundredth of a second, i.e. once per half-wave of the usual 50 Hz alternating current, a value of consumption of electric power by the individual consumers is measured to consider it when determining the characteristic time curves of the consumption of electric power by the individual consumers. Due to the high temporal resolution of the measurement, the characteristic chronological developments of the consumption of electric power by the individual consumers may already be determined from the total power consumption without the need to carry out separate measurements at the individual consumers. It is to be understood, however, that the accuracy of the characteristic consumptions may be further enhanced by means of separate measurements at the individual consumers.

As a result, the plan for apportioning electric power to the individual consumers within the future period of time may have a temporal resolution equal to this high sample rate. This, in turn, is a precondition for considering characteristic variations of the consumption of electric power by the individual consumers which occur at a high frequency when making the plan. Without this consideration of fast variations, i.e. if only average values over comparatively long periods of time are measured and considered, the consumption of electric power by the entirety of the individual consumers may considerably exceed the supply of electric energy by the power generator at one moment, whereas it does not exploit the power supplied at the next moment. As a result, an oscillation of electric power between the local power grid and a connected public power grid occurs which stresses the public power grid considerably although the average power imported from the public power grid is zero.

In the method, even faster variations of the consumption of electric power by the individual consumers may be considered than they can be determined by means of the limited sample rate at which the consumption of electric power by the individual consumers is measured. For this purpose, additional information on the respective consumer may be used which may already be identified by means of its characteristic consumption behaviour determined at the sample rate. This information may be retrieved from an external data base on the basis of the characteristic consumption and/or on the basis of an identification code entered by the user and identifying the consumer. This information may especially comprise histograms which relate the relative frequency of certain instantaneous values of electric power consumed by a consumer to the averaged electric power consumed by the consumer which is actually measured at the limited sample rate. Thus it is possible to infer from the measurements at a limited sample rate the existence and frequency of instantaneous peak values of the power consumed by the consumer and to take these peak power values and their frequency into account when making the plan. The phase of variations at a higher frequency generally known in this way may still be determined at a sample rate which is not sufficient for completely recording the variations of the consumption of the consumer.

In that the characteristic time curves of the consumption of power by the individual consumers are determined at a comparatively high sample rate, temporal variations of the consumption by the individual consumers may be considered when making the plan for apportioning electric power to the individual consumers. In an ideal case, the available electric power is apportioned to two or more consumers with oscillating consumption of electric power in antiphase or at offset phases, so that the consumption of the consumers is mutually exclusive and the total consumption is balanced. At least, a consumption of electric power by such consumers which is temporarily higher than average may be considered when making the plan for apportioning electric power, and in the periods of low consumption by such consumers, the thus unused electric power may be apportioned to other consumers. For this purpose, besides consumers which also have an oscillating consumption and which may be operated in antiphase, particularly such consumers may be utilized which are not depending on a continuous supply with electric power. A lot of heating devices and energy storage devices, for example, belong to these consumers.

If a purposeful apportionment of electric power to individual consumers shall take place in gaps of the consumption by other consumers, it is clear that the apportionment of electric power according to the plan also has to take place at a high clock rate of at least 0.1 Hz, for example, at least 1 Hz, at least 10 Hz or at least 100 Hz, i.e. once per halve wave of the usual alternating current.

If no considerable security stock is built in the prognosis, which—if not needed—corresponds to a considerable amount of power which is not consumed locally, undershooting the prognosis by the electric power actually supplied by the power generator cannot be avoided. Similarly, there may be an unplanned consumption of electric power in that, for example, a consumer which is to be supplied with electric power unconditionally, like for example a lighting device, is switched on by a user. Thus, in one embodiment the plan for apportioning electric power to the individual consumers is continuously updated based on the actual supply of electric power and on the actual demand of electric power of the individual consumers.

Consumers whose demands of electric power result in exceeding the supply of electric power from the at least one power generator may, particularly if this happens repeatedly, be marked with a marker. This marker may then be considered in updating the plan for apportioning electric power to the individual consumers. This consideration may include that electric power will only be apportioned to the respective consumer if this power is available for certain. The marker may have a variable value which increases with the number and/or the height of the excesses of the supply of electric power from the at least one power generator. This establishes a malus system in which the highest malus means that only such energy is apportioned to the consumer which is not useable in any other way.

In an embodiment, it is part of the plan that apportioning electric power to the individual consumers includes a limitation of the maximum power which may be consumed by at least one individual consumer. This means that electric power is apportioned to the at least one consumer but not to an unlimited extent, i.e. not to any extent which may be demanded by the consumer, but only to a limited extent. In this way, the function of the consumer may be ensured permanently, on the one hand, but an excess of the electric power supplied by the power generator may be avoided, on the other hand. The limitation of the power which may be consumed at maximum may particularly be applied to consumers which have already been marked with the marker explained above. Consumers to which a limited electric power may be supplied without generally affecting their function include many electric heating devices, including washing machines and dish washers during their heating phases, and many lighting devices.

The limitation of the maximum power which may be used by one individual consumer may, for example, be effected by pulse width modulation, for example, by so-called phase-controlled modulation, which is common in dimmers, for example. In phase-controlled modulation only a part of each half wave of the alternating current is supplied to an AC consumer. The part of the half wave supplied may be varied half wave by half wave, i.e. at a clock rate of 100 Hz at maximum.

It is also possible to intervene in the consumption of electric power by consumers which may be arbitrarily switched on by a user or which may themselves arbitrarily switch on and to which electric power has to be supplied unconditionally to ensure their function. Thus, by limiting the electric power which may be consumed by a lighting device which has to function all the time for security reasons, for example, electric power may be saved which is needed elsewhere. By limiting the electric power which is supplied to an electric heating device, which operates in an on/off-operation to keep a preselected temperature, like for example an electric stove, the on-intervals will be extended without affecting the general function of the heating device. The electric power saved in this way of limiting the electric power consumable by an individual consumer can be used elsewhere. Further, it results in a levelling, i.e. in a homogenization of the electric power consumed by the individual consumer. This levelling is maximized when the on-intervals are only interrupted by short off-intervals at longer periods of time which indicate that the controller of the heating device is still functioning. Even this function may be monitored by measuring the actual consumption of the individual consumers at the high sample rate.

Apportioning electric power to the individual consumers may, for at least one individual consumer, take place via a switchable single connector, i.e. via a single connector for a single one of the individual consumers which can be switched on and off. Further, it is possible that apportioning electric power to the individual consumers is effected by accessing an interface of a controller of at least one individual consumer having such an accessible interface. For consumers which may neither be switched on and off via a switchable connector nor have an accessible interface, apportioning electric power may often be achieved via a controllable actuation element for a switch-on bottom of the consumer, which is mounted to the consumer. This, for example, applies to various washing machines and dish washers. Further, it is to be understood that the various procedures of apportioning the electric power to the individual consumers may also be used in combination.

Which options of intervening in the present consumption of electric power by the individual consumers exist, strongly depends on the individual consumers. These intervention options may to a certain extent be determined by tests. However, in one embodiment the intervention options are determined by accessing entries related to the individual consumers in an external data base.

Further, characteristic time curves of the consumption of electric power by the individual consumers may, via a bidirectional data base connection, be uploaded into an external data base and/or downloaded from there. The characteristic time curves may particularly comprise different consumption curves for different consumer settings.

The identification of the individual consumers which is necessary for downloading information with regard to the individual consumers from a data bank may be made by manual input. Often, however, this identification is also possible based on the characteristic time curves of the consumption of electric power by the individual consumers. This means that the characteristic time curve of the consumption is used as an identifying fingerprint of the respective consumer.

As some consumers only show individual characteristics of the time curve of their consumption of electric power in a higher range of frequencies, the consumption of electric power by the individual consumers in terms of the respective current and voltage curves at the individual consumers are measured at a sample rate of at least 1 kHz in one embodiment, particularly of at least a several kilohertz. Often, an evaluation of this highly temporally resolved determination of the time curve of the consumption of the individual consumers also allows for conclusions on options of intervention in this consumption, like for example by pulse width modulation.

At least then when the members of the group of the individual consumers and the characteristic time curves of their consumptions are generally known, it is possible to allocate the individual consumers to single connectors at which a consumption with the respective characteristic time curves is measured, for example.

Further, the individual consumers may be monitored for proper function by comparing the actual time curves of their consumption with the characteristic time curve of their consumption. It is to be understood that any limitations to their consumption of electric power set as an apportionment measure according to the plan have to be taken into account here.

In an embodiment of the method, the consumption of electric power by each individual consumer is measured at its single connector to the local grid. Generally, however, one single electric meter is sufficient for measuring the consumption of electric power by each individual consumer. This electric meter indicates the sum of the consumption of electric power by all individual consumers. Particularly, when measuring the total consumption at a high temporal resolution it will be easily recognized whether the total consumption includes the characteristic time curves of the consumption of electric power by certain consumers, i.e. which consumers presently consume electric power and in which stage of their characteristic time curve of the consumption of electric power they presently are. At least by switching the individual consumers on and off, the contribution of each individual consumer to the total consumption can definitely be determined, even if the characteristic time curves of the consumption of the individual consumers are not yet known. Following this determination of the characteristic time curves of the consumption of electric power it is possible to take even those consumers whose consumption is not measured individually into account when making the plan for apportioning electric power to the individual consumers.

The total consumption may also be measured in order to determine a characteristic time curve of the consumption of electric energy by all those consumers whose consumption will not be modified because no intervention is possible at all due to missing technical options or because no sensible intervention is possible, and to consider this characteristic time curve in making the plan for apportioning electric power to the individual consumers whose consumption can be suitably modified. The characteristic time curve of the consumption of electric power by all consumers whose consumption is not modified typically relates to a comparatively long period of time, which particularly includes at least one day but which may also include a week, a month or even a year (to capture seasonal variations). The period of time to which the characteristic time curve of the consumption of electric power relates, may thus particularly be longer than the future period of time for which the plan for apportioning electric power is made. Vice versa, the characteristic time curve of the consumption of electric power by the individual consumers whose consumption is modified or intervened in particularly relates to a comparatively short period of time which typically includes an operation period from switching the individual consumer on or a start up of the individual consumer up to its next switching off or shutting down, and which is rarely longer than a day and thus rarely longer than the future period of time for which the plan for apportioning electric power is made. An operation period of a refrigerator, for example, runs from each start up to the next stop of its chiller, whereas an operation period of a washing machine corresponds to one washing program.

At this point it should be mentioned that in the method described here it is neither necessary to intervene in the consumption of electric power by each individual consumer of a local power grid nor to determine a characteristic time curve of the consumption of electric power for each individual consumer, particularly not for consumers whose consumption will not be modified. Instead, for example, several or all consumers whose consumption is anyway not modified may be regarded as one further individual consumer.

Actually, (i) the electric power fed into the public power grid, (ii) the power imported from the public power grid, and (iii) the power locally produced by all power generators may be measured to determine a total consumption of electric power in the local power grid and its time curve. Based on this total consumption a basic consumption prognosis is made by subtracting the consumption of electric power by all consumers whose consumption may be modified or intervened in. This basic consumption prognosis corresponds to the characteristic time curve of the consumption of electric power by all consumers whose consumption may not be modified or will not be intervened in. If the goal is to optimize local consumption, the difference between this basic consumption prognosis and the prognosis of the development of the supply of electric power which is generated by the at least one power generator is the free range for the plan for apportioning electric power to the individual consumers whose consumption may be modified.

From a single connector of an individual consumer, further electric values of the respective consumer like for example an impedance between its connection lines may be measured besides the consumption of electric power. Based on these values, one may, for example, conclude on the present switching state and, by means of extrapolation or even directly, on the present temperature of heating or cooling devices switched by a bimetallic device. Another option of measuring electric values of at least one individual consumer from its single connector is to supply electric power to the consumer for testing whether and to which extent it would consume this power at present.

Even further physical values of an individual consumer may be measured by additional sensors and considered in updating the plan for apportioning the electric power. For example, temperature sensors may be mounted to refrigerators and other cooling devices or to heating devices, indicating by their signal how necessary apportioning electric power to the respective device is at present. In refrigerators, an opening of the door may also be captured by an appropriate sensor in order to activate the interior illumination of the refrigerator by supplying current to the refrigerator or by activating an auxiliary illumination. Additionally, an opening of the refrigerator door may be used as an indication of an approaching demand of electric power by the refrigerator, and this indication may be considered in updating the plan for apportioning the electric power.

The prognoses with regard to the chronological development of the supply of electric energy from the power generator are made in one embodiment on the basis of weather forecasts. Particularly local weather forecasts and also running weather reports belong to these weather forecasts. In case of a solar power generator, one also has to consider the course of the solar altitude over the present day in making the prognosis with regard to the chronological development of the supply of electric energy. Further, the characteristics of the power generator have to be considered.

The weather forecasts used in making the prognoses with regard to the chronological development of the supply of electric energy may also be used to notice thunderstorms at the location of the respective local power grid and to then switch off endangered consumers and/or power generators.

Particularly in situations when the supply of electric power by the power generator is not sufficient, a further prognosis of a chronological development of conditions of an import of electric power from a public power grid may be made for the future period of time, and this further prognosis may be considered in making the plan for apportioning electric power to the individual consumers in the future period of time. Also in a situation when the electric power supplied by the power generator is generally sufficient or even when excess electric power may be fed into the connected public power grid, such a further prognosis can be an advantage. For example, there may be an option to feed the electric power supplied by the power generator at a certain point in time into the public power grid at a very favorable, i.e. high tariff, whereas the generated electric power could only be fed into the public power grid at a less favorable tariff, but can be re-imported from the public power grid at a more favorable, i.e. lower tariff, at another point in time within the future period of time.

In the further prognosis, tariffs of different power suppliers may be considered in addition to variable tariffs. The effects of an achievement of a same result in an alternative way under other conditions of the import of electric power from the public power grid and/or of the feeding of electric power into the public power grid for the future period of time or for a past period of time may also be determined. In this way, one may for example search for the most favorable tariff of all available tariffs of different power suppliers under the conditions of the plan for apportioning electric power to the individual consumers in the future, and one may also countercheck such a decision afterwards.

When making the plan for apportioning electric power to the individual consumers in the future period of time, particularly the bidirectional exchange of electric power with an electrical storage device and/or a public power grid, e.g. buffering electric power in batteries or even feeding electric power out of batteries into the public power grid may be considered. For this purpose, a further prognosis of a chronological development of conditions of buffering electric power in a storage for electric energy may be made for the future period of time, and this prognosis may be considered in making the plan for apportioning electric power to the individual consumers within the future period of time. The conditions of buffering electric power may comprise costs for this buffering which may be derived mainly based on the costs for purchasing and operating the electric storage device, taking into consideration the life expectancy as well as the total number of load cycles. Due to power tariffs varying over time, the plan for apportioning electric power to the individual consumers may result in the opposite of a maximum local consumption of locally produced electric power. In this case, the method described here utilizes the public power grid but actively supports the supply of electric power in the public power grid for matching the present demand of electric power.

According to the principles disclosed here, groups of consumers and/or power generators may be interconnected. Thus, a further prognosis of a chronological development of conditions of transferring electric power to and from at least one other group of consumers and/or power generators for the future period of time may be made, and this prognosis may be considered in making the plan for apportioning electric power to the individual consumers within the future period of time.

There are cases in which a desired result achieved by means of one of the existing consumers or power generators may also be achieved to the same extent by means of one other present consumer or power generator or another existing device. This applies, for example, if a heating power for the heating of water may be either provided by burning a fuel or by transforming electric power into heating power, or if electric power may be provided by different fuel-driven generators and/or by a battery. In these cases, a further prognosis of a chronological development of conditions of an achievement of a same result in an alternative way by means of another existing consumer or power generator or another existing device may be made for the future period of time and may be considered in making the plan for apportioning electric power to the individual consumers over the future period of time. The consideration of this prognosis may, for example, be made from the point of view of (i) the total cost, (ii) the $CO_2$ emission or (iii) the locally emitted exhaust gases.

Further, the potential effects of an achievement of a same result in an alternative way by means of another, presently not existing consumer or power generator or another, presently not existing device may be determined for the period of time in the future or a period of time in the past. From these determinations it may be derived whether it would be beneficial to exchange one of the consumers or power generators by another or to install a further power generator, for example.

Besides consumers which will demand power during each future period time of a certain length, there are many consumers which do only demand electric power at longer or even very irregular intervals of time. Such consumers may nevertheless be integrated in the plan for apportioning electric power, if advance notifications for the operation of these consumers are available, e.g. provided by a user. Such advance notifications may particularly include as a temporal setting: (i) a desired term of operation of a consumer, like for example a washing machine, (ii) a desired end point of this operation, like for example the desired point in time for finishing a washing operation, or (iii) a desired temperature range for hot water which should be available within a certain interval of time.

Besides such advance notifications, the user may assign different priorities to the individual consumers for the future period of time. These priorities may then be considered when making the plan for apportioning electric power to the individual consumers. These priorities may range from such which guarantee an unconditional apportionment of electric power down to such which only allow an apportionment of electric power if there is an otherwise unusable surplus of power generated by the at least one power generator or if there is a demand of negative control power for a connected public power grid.

The advance notifications and the priorities are user goal settings of individual character as they, as a rule, are consumer specific, and thus differ from global consumer goal settings which indicate goals striven for by concerted action of all consumers, power generators, storages and the public power grid. In the same way as in case of different global consumer goal settings, like for example between maximization of local power consumption and cost minimization, there may also be principal conflicts between advance notifications and priorities or between such individual goal settings on the one hand and global user goal settings on the other hand. However, these conflicts are automatically solved in the method described here in that the individual user goal settings are implemented by weighting the consumption and/or the supply of electric power.

Actually, all user goal settings are implemented by differently weighting the consumption of electric power by different consumers and/or the supply of electric power by different sources within the future period of time. The different weightings of the consumption of electric power by different consumers may actually include different weighting factors for the electric power consumed by the different consumers and/or the related cost within the future period of time. Alternatively or additionally, the different weightings of the supply of electric power by different sources may include different weighting factors for the electric power supplied by the different sources and/or the related cost within the future period of time.

Such a weighting factor may, for example, also be defined as a functional correlation between a planned start and/or end point in time of the operation of a consumer on the one hand, and a desired start and end point in time input as an advance notification on the other hand, and may consider a user priority in such a way that the weighting factor is higher the higher the deviation is of the planned points in time from the desired points in time. A further weighting factor may be defined as a functional correlation between a hot water temperature desired in a certain period of time and a hot water temperature achievable within this period of time according to the actual plan in such a way that the weighting factor is higher the lower the achievable temperature is. Additionally, upper and lower limits may be set both for the desired temperature and for the start and end points, and exceeding or undershooting these limits may result in an exponentially falling or rising weighting factor, respectively. This, however, are only two examples for the weighting factors for the consumed electric power and/or its cost may vary within the future period of time and may particularly be a function of time. Even an unconditioned switch-on-wish for a certain consumer for a certain interval of time may be represented by a special value of the corresponding weighting factor within this interval of time. For example, the special value may be zero or, if the period of time is not met, "infinite".

Further, dependencies with regard to the relative temporal sequence of the operation of certain consumers may be defined in that the weighting factors are linked in such a way that the weighting factor of a certain consumer has the value "infinite" as long as the operation of another certain consumer has not yet ended. An example for such a necessary sequence is the operation of a tumble dryer which naturally may only be suitably scheduled for a period of time after completition of a washing program of a washing machine.

Further, parameters which describe the present or planned conditions of consumers may have an influence on the weighting factors. When using energy storages, for example, their present and estimated future energy content as well as their natural self-discharge may be used in making the plan.

If different user goal settings come together, i.e. shall be valid at the same time, the corresponding weighting factors may simply be added up prior to their application. If the different user goal settings shall be considered equally, they have to be normalized to a common standard before this. The weighting factors for different user goal settings that are valid at the same time may, however, also have basic weighting factors which are normalized to a common standard corresponding to an equal importance of the various user goal settings but which are then multiplied with a importance factor which may be fixed for each user goal setting and which corresponds to the relative importance of this user goal setting with regard to the other user goal settings valid at the same time. By different heights of these importance factors, a user preference of one user goal setting with regard to one or more other user goal settings valid at the same time will be considered.

For simultaneously considering the goal settings valid at the same time according to their individual importance, a sum of the weighted consumed electric power and/or a sum of the weighted cost of the consumed electric power may for example be limited or minimized in making the plan for the apportionment of electric power to the individual consumers.

All in all, the present disclosure provides for a workable weighting of actually planned consumptions of electric power by individual consumers based on various user priorities and user goal settings. Exemplary user goal settings which may be mentioned here include: "minimization of the cost", "minimization of the consumption of electric power supplied by the public power grid", "minimization of the deviation of the start and/or end point of the operation of a consumer from a time setting", and "minimization of the deviation of a hot water temperature within a certain interval of time from a desired temperature". A sum of such weighted consumptions may then be limited to a maximum value or generally limited when making the plan for the apportionment of electric power to the individual consumers. In this way, it is possible to consider further factors besides the actual monetary cost of consumption of electric power in a simple and user-convenient way, wherein these further factors may be individually defined by the user and weighted with regard to each other.

In a three-phase power grid, apportioning electric power to individual single-phase consumers may be uniformly distributed over the three phases according to the plan. This avoids unbalanced loads which despite of less overall consumption of electric power than produced by the power generator may nevertheless have the result that electric power is imported from a connected public power grid via one phase, while at the same time electric power is fed into the public power grid via another phase.

The consumption optimization described here can be executed by means of a central controller for apportioning electric power to the individual consumers, which determines the characteristic time curves of the consumption of electric power, and which makes the prognosis of the chronological development of the supply of electric power by the at least one power generator for the future period of time and, based on this and user goal settings, makes the plan for apportioning electric power to the individual consumers in the future period of time and then apportions the electric power according to the plan to the individual consumers in the future period of time. An apparatus as disclosed here will comprise measurement devices which measure the consumption of electric energy to be able to make the consumption optimization.

Single connectors each connecting a single one of the individual consumers are provided in one embodiment by sockets or socket adaptors switchable wirelessly or via power line communication. The sockets or socket adaptors may include measurement devices for the respective consumer which transfer their measurement values wirelessly or via power line communication to the central controller.

To also activate such consumers which may not simply be switched on and off by apportioning electric power according to the plan, the apparatus may comprise at least one controllable actuation element which may be mounted relative to a switch-on button of an individual consumer. This actuation element may be controlled by the central controller and presses the switch-on button of the consumer upon a trigger command sent by the central controller, so that the central controller starts the individual consumer and thus apportions electric power to it.

Alternatively, the central controller may also comprise an interface via which it communicates with at least one interface of a controller of one of the individual consumers.

To obtain information particularly with regard to the intervention options in the present consumption of electric power by the individual consumers, in one embodiment the central controller comprises an interface via which it communicates with an external data base. This may, for example, be done via the internet. An interface to the internet may also be used by the central controller for receiving weather forecasts and weather reports as well as for receiving conditions of an import of electric power from the public power grid.

The central controller may also comprise an interface for receiving conditions of buffering electric power in a storage device for electric energy. This interface may actually be configured for receiving the conditions of buffering electric power in the storage device for electric energy from an energy management device of the energy storage device. Such energy management devices are included in known storage devices storing electric energy in batteries, for example.

The central controller may further have an interface for interconnecting with at least one further similar apparatus. Via this interface the central controller may exchange prognoses of the chronological development of the supply of electric power in the future period of time with at least one further similar apparatus. The central controller may also exchange conditions of a transfer of electric power to and from devices connected to the at least one further similar apparatus via the interface to make a further prognosis of a chronological development of the conditions of the transfer of electric power to and from the devices connected to the at least one further similar apparatus for the future period of time, and to consider this prognosis when making the plan for apportioning electric power to the individual consumers for the future period of time.

For accepting user-defined advance notifications of the operation of individual consumers within the future period of time, the apparatus described here in one embodiment comprises input units to be arranged at or mounted to the individual consumers which communicate with the central controller. Via these input units the user may, for example, set a time frame for fulfilling the advance notifications and input other details of the advance notifications like for example the program of a washing machine which he has set and which has a considerable influence on the consumption of electric power by the washing machine during the future period of time once the washing machine has or has been started.

The input unit may have a display via which the central controller may give recommendations to the user in terms of preferable advance notifications which may comply particularly well when making the plan. Particularly then, when the respective input unit allows demanding immediate operation of the individual consumer, the display unit may also be used to indicate to the user whether this immediate operation will be possible within the limits of the power presently provided by the power generator. These indications with regard to the presently available electric power may also be provided at consumers which generally have a high priority in the apportionment of electric power, like for example lighting devices, to guide the user behaviour.

The apparatus disclosed here may also have a display unit for displaying the entire plan for apportioning electrical power to the individual consumers. This display unit may be provided at the central controller but may also be located remote thereof.

To avoid unbalanced loads within a three-phase local grid operated according to the plan for apportioning electric power in a simple way, the apparatus described here may have at least one adaptor with a three-phase AC power input and at least one single-phase AC power output which may be selectively connected or switched to the different phases of the three-phase AC power input.

A local power grid described here comprises a group of different consumers and at least one wind or solar power generator. The local power grid may be an island grid. If connected to a public power grid, wherein the local power grid in one embodiment has a bidirectional connection which is provided with a feeding meter for the power fed into the public power grid and at least one consumption meter for the electric power imported from the public power grid. There may be a plurality of consumption meters to be able to selectively consider different tariffs or different power supplies in consuming electric power imported from the power grid.

The size of the local power grid connected to the public power grid may vary from a single household over a street with connection to a local area power grid via a distribution point up to an intermeshed local area network connected to a medium voltage power grid via a local area transformer. The wind or solar power generator may be located somewhere in the local power grid. The households of a street or of a local area network which are interconnected to form the local power grid described here may all have a wind or a solar power generator, but this is no requirement. Any or even all wind and solar power generators integrated into the local power grid described here may be arranged remote from the individual households.

Further developments of the disclosure result from the claims, the description and the drawings. Advantages of features and of combinations of several features mentioned in the introductional part of the description are only examples and may come into effect alternatively or cumulatively, without the necessity that the advantages have to be achieved by embodiments of the disclosure. Further features can be taken from the drawings—particularly from the depicted relative arrangement and operational connections of several parts. The combination of features of different embodiments of the disclosure and of features of different claims is also possible and is encouraged herewith. This also applies to such features which are depicted in separate drawings or mentioned in their description. These features may also be combined with features of different claims.

Figure 1:
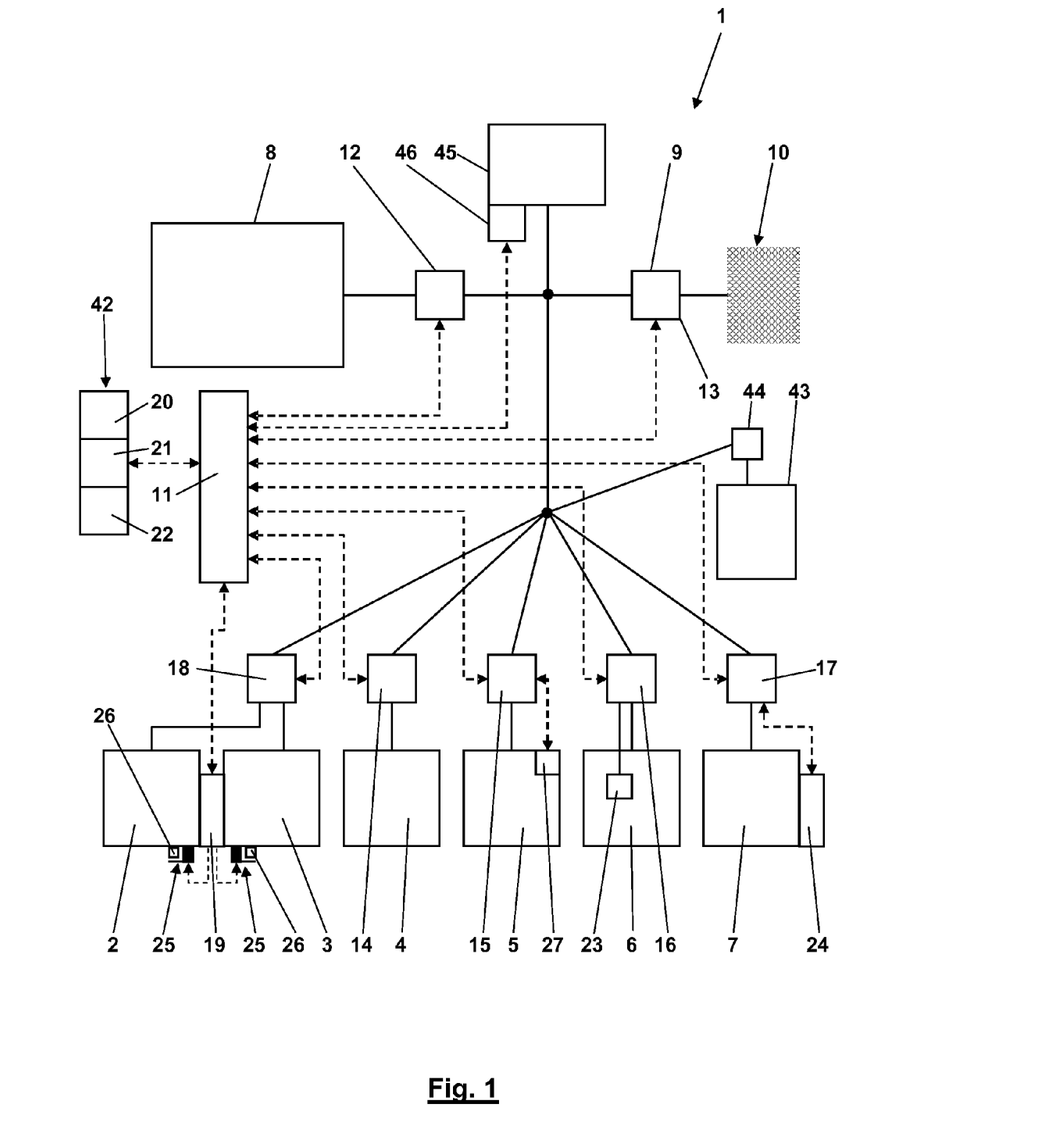
FIG. 1 shows a block diagram of a local power grid.

Now referring in greater detail to the drawings, FIG. 1 schematically depicts a local power grid 1 including (i) a group of consumers 2 to 7, (ii) a power generator 8, particularly a solar power generator, (iii) a grid connection point 9 at which the local power grid 1 is connected to a public power grid 10, and (iv) a central controller 11 (CTRL). The central controller 11 apportions electric power provided by the power generator 8 to the consumers 2 to 7 such that, for example, a maximum local consumption of this power is achieved, i.e. a power consumption without use of the public power grid 10. For this purpose, the central controller 11 comprises the following communication connections which are all made wireless here:
a connection to the power meter 12 which measures the actual power of the power generator 8; a connection to a power meter 13 at the grid connection point 9 which comprises at least one consumption meter for electric power imported from the public power grid 10, but in one embodiment comprises several consumption meters, and at least one feed-in meter for electric power from the power generator 8 fed into the public power grid 10; connections to single connectors 14 to 17 of the consumers 4 to 7 and to a double connector 18 of the consumers 2 and 3; a connection to an input unit 19 for user-definable advance notifications of the operation of the consumers 2 and 3; a connection to an energy management unit 46 of a storage 45 for electric energy, like for example in batteries, and a connection to the internet 42.

The internet 42 provides the controller 11 with access to (i) a data base 20 including information about the consumers 2 to 7, (ii) a source 21 of weather reports, and (iii) a source 22 of tariff information about power tariffs for importing electric power out of the public power grid 10. The single connectors 14 to 17 include measurement devices for measuring the consumption of electric power by the individual consumers 4 to 7. The consumption measurements are carried out at a high sample rate of at least 0.1 Hz. The consumption measurement values are transferred to the central controller 11. Further, the individual connectors 14 to 17 are switchable to convey or interrupt the power supply to the consumers 4 to 7. This switching of the power supply may take place at a low or at a high frequency, the latter for example in the sense of a phase-controlled modulation of an alternating current. The individual connectors 14 to 17 may also comprise measurement devices for other electric values of the consumers 4 to 7 besides the measurement devices for the consumption of the individual consumers 4 to 7. Further, a sensor 23 may be connected to an individual connector, like here to the individual connector 16, to monitor further physical values of the consumers 6, like for example the temperature in the interior of a refrigerator. Additionally, an input unit 24 via which the user of the consumer 7 may make advance notifications of the operation of the consumer 7 may be connected to an individual connector like here to the individual connector 17. It belongs to this option that the user demands a direct availability of the consumer 7 to be able to directly switch it on independent of the plan of apportioning electric power of the power generator 8 by the central controller 11. The double connector 18 for the consumers 2 and 3 basically is a doubled single connector for two consumers in which the measurement devices are used for both consumers 2 and 3 connected. The double connector 18 may allow for the operation of one or both consumers 2 and 3 at one point in time. An input device 19 which directly communicates with the central controller 11 but which could also communicate with the central controller 11 via the double connector 18 is provided for user-definable advance notifications of the operation of the consumers 2 and 3. Actuation elements 25 for switch-on buttons 26 are mounted to the consumers 2 and 3 which are here controlled by the input unit 19 but which could also be directly controlled by the central controller 11 or via the double connector 18. The actuation elements 25 allow for purposefully activating the consumers 2 and 3, when their activation via simply apportioning electric power is not possible. Another activation mechanism than via simply switching on the current is carried out in case of the consumer 5 in that the central controller 11 communicates via the single connector 15 with the controller 27 of the consumer 5 and thus initiates a start or an interruption of its operation at a point in time determined by the central controller 11. Such a controller 27 comprising an interface for external communication is part of many but not of all, particularly not of old household equipment. By switching the single connectors 14 to 17 or the double connector 18, respectively, and by operating the actuation elements 25 for switch-on buttons 26, the central controller may, however, also control the time curve of the consumption of consumers without such a controller 27. Further consumers 43 which are only exemplarily depicted here, may be supplied with electric power in the power grid 1 via further single connectors 44 without own measurement or control facilities.

The time curve of the power consumed by these consumers is represented by the time curve of the data of the power meters 9 and 12 and may thus also be considered in the method which will be described in further detail with reference to FIG. 2. Electric power may be bi-directionally exchanged with the storage 45 for electric energy, in the same way as with the public power grid 10. However, whereas the power accepting and power providing capacitance of the public power grid 10 are virtually unlimited, the corresponding capacities of the storage 45 are limited and, for example, depend on the type and the number of its batteries. The energy managing unit 46 of the storage 45 manages these capacities and forwards the conditions of temporary storing electric power in the storage 45 to the central controller 11.

Figure 2:
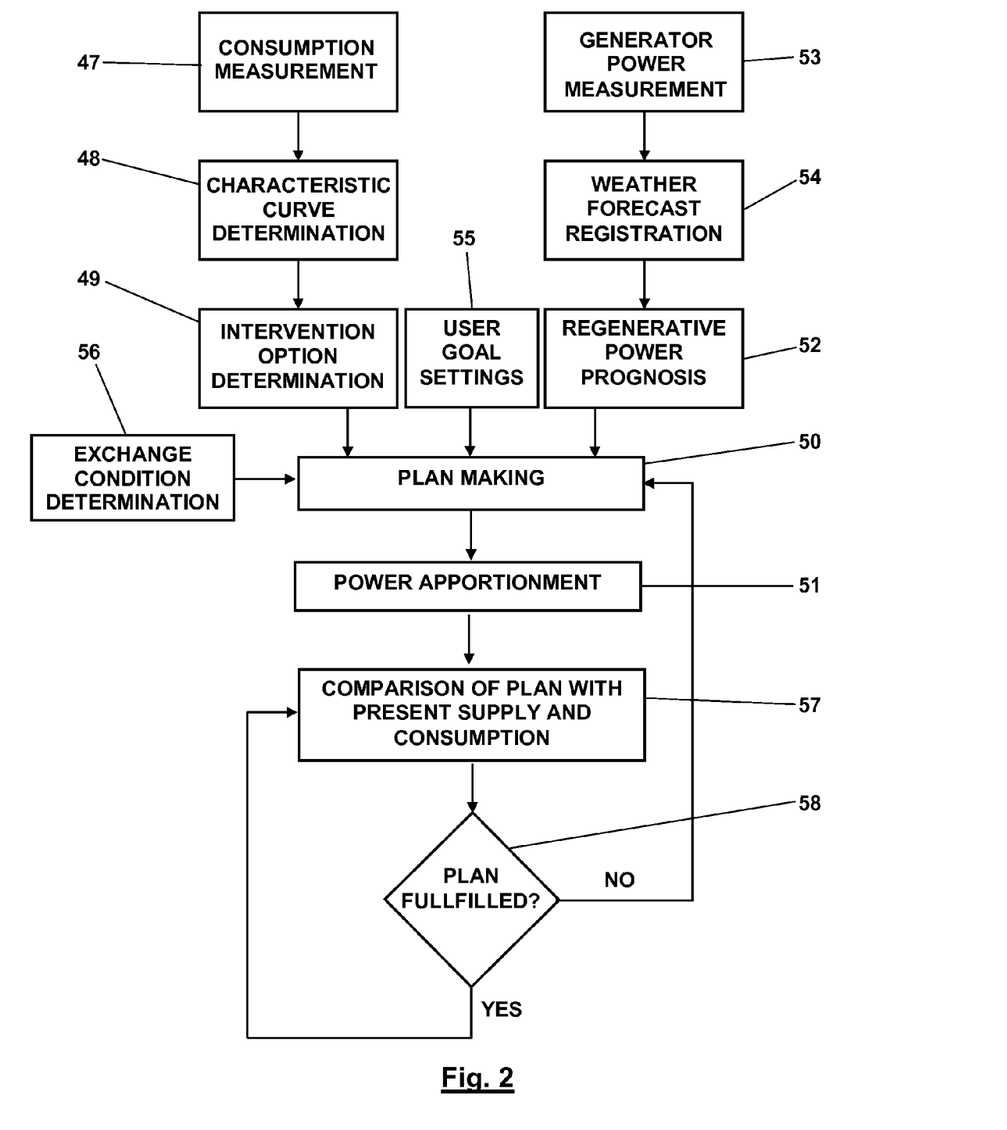
FIG. 2 is a flow diagram of a method of optimizing the power consumption in the local power grid according to FIG. 1.

FIG. 2 illustrates a method according to which the central controller 11 according to FIG. 1 may operate to achieve its goal of a maximum local consumption of the power supplied by the power generator 8 with minimum utilization of the public power grid 10 and in consideration of the advanced notifications by the user. The central controller 11 at first measures 47 the consumption of electric power by the individual consumers. This is done at a sample rate of at least 0.1 Hz; even considerably higher sample rates may be used. Sample rates of at least 100 Hz, i.e. once per half wave of a usual alternating current which flows in the respective power grid, or sample rates even in the kHz range may be beneficial. The consumption measurements are used to determine 48 characteristic time curves of the consumption of electric power by the individual consumers. These characteristic time curves determine the expected power consumption of the individual consumers at certain future points in time after being switched on, on the one hand, and they provide an option of identifying the individual consumers, on the other hand. For both aspects, a high temporal resolution of the time curves of the consumption is a considerable advantage. Based on an identification of a consumer due to the characteristic time curve of its consumption, it may be determined 49, what intervention options in the consumption of electric power by the individual consumers are available. Particularly, these intervention options can be downloaded from an external data base. This download may be based either on the characteristic time curve of the consumption of the individual consumer and/or on an identification code of the consumer entered by a user or supplied by a controller of the consumer. It belongs to the intervention options which are available for a consumer that the consumer is operated earlier than usual at a point in time at which more electric power is available than needed. In this way, for example, a generation of cold or heat actually needed later may be pre-executed. This pre-execution of the generation of cold or heat can be very reasonable if it shifts forward a power demand of the same consumer from a later point in time at which the power supplied by the power generator is limited. Refrigerators and freezers may be cooled down to a lower temperature than actually needed at present; however, it has to be avoided that the temperature in a refrigerator is lowered too much as it would otherwise result in an undesired formation of ice.

The characteristic time curves of the consumption of the individual consumers and the intervention options in these time curves form a basis for making 50 a plan according to which the central controller apportions 51 electric power to the individual consumers in a future period of time. Another basis of this plan is a prognosis 52 of the power which will be supplied by the power generator over this future period of time. In one embodiment this prognosis is also based on measurements, namely on measurements 53 of the power of the generator, which are evaluated in combination with the associated weather situations (and in case of a solar power generator also in combination with the associated solar altitudes), and from which a chronological power development prognosis 52 for the future is derived considering 54 up to date weather forecasts. Further, the plan is based on the user goal settings 55 and the conditions 56 of the bi-directional exchange of electric energy with the storage 45 and the public power grid 10 according to FIG. 1. The plan 50 for the future apportionment 51 of electric power may include an adaptation of the points in time at which the individual consumers are switched on as well as a deformation of the characteristic time curves of the consumption of electric power by the individual consumers. These measures may particularly be taken to not exceed the supply of electric power from the power generator by the power demand of individual consumers, not even for a short time, and particularly not by consumers with oscillating consumption of electric energy. In an ideal case, the local power grid is operated even without short time import of electric power from the public power grid. As deviations from the plan due to not forecasted weather changes as well as due to unplanned demands of operation of individual consumers by a user can not be excluded, the plan is compared 57 to the actual supply and consumption of electric power, and it is continuously checked 58 whether the desired result is successfully achieved by comparing the actual supply of electric power with the actual consumption of electric power. If the desired result, like for example an exclusive local consumption of electric power and/or other user goal settings, is not achieved, the plan is updated 50.

Figure 3:
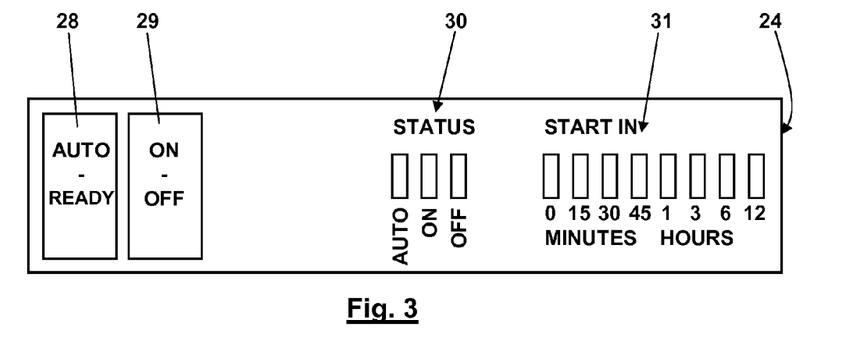
FIG. 3 shows an input device for use in connection with the method according to FIG. 2.

FIG. 3 shows the front of the input device 24 according to FIG. 1. This front includes a first selector switch 28 for selecting an "AUTO" operation mode in which the associated consumer 7 is controlled by the central controller 11 or a "READY" operation mode independent on the central controller 11. Via a second selector switch 29, the associated consumer 7 may be switched on for a point in time to be determined by the central controller 11 in the "AUTO" operation mode, or directly started in the "READY" operation mode, respectively. A status display 30 allows for monitoring the input via the selector switches 28 and 29. A switch-on time display 31 indicates after which time or at which point in time the consumer will presumably be switched on by the central controller 11. With the aid of this switch-on time display, the user may also enter a time frame within which the consumer has to be started by the central controller 11.

Figure 4:
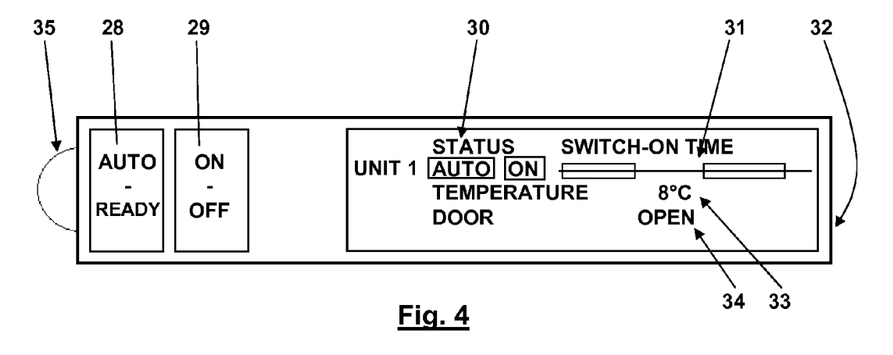
FIG. 4 shows another embodiment of an input device for use in the method according to FIG. 2.

FIG. 4 shows the front of an input device 32 for a refrigerator as a consumer. Here, the same selector switches 28 and 29 as in FIG. 3 are provided. The status display 30 is also comparable. In addition to the switch-on time display 31, however, there is a temperature display 33 by means of which the user may select the target temperature in the interior of the refrigerator and which may display the actual temperature of the refrigerator, and a door opening display 34 which indicates the status of a door opening sensor. Such a door opening sensor may also be used for switching on a backup or auxiliary illumination for the interior of the refrigerator, if the power supplied to the refrigerator is apportioned by the central controller in such a way that the power is only supplied at longer intervals. Further, the door opening sensor may be used for indicating that due to the heating up of the interior of the refrigerator as a result of the door having been open, the refrigerator will demand a supply of electric power shortly. The input device 32 may directly comprise a backup light source 35 for the interior of the refrigerator, a temperature sensor and the door opening sensor and thus be configured for being placed within the interior of the refrigerator. It is to be understood that the built-in temperature control of the respective refrigerator has to be adjusted to the lowest allowable temperature for enabling the central controller to take over the temperature control by means of the temperature sensor of the input device 32, and to both pre-cool below the target temperature and accept temporal small excesses of the target temperature.

Figure 5:
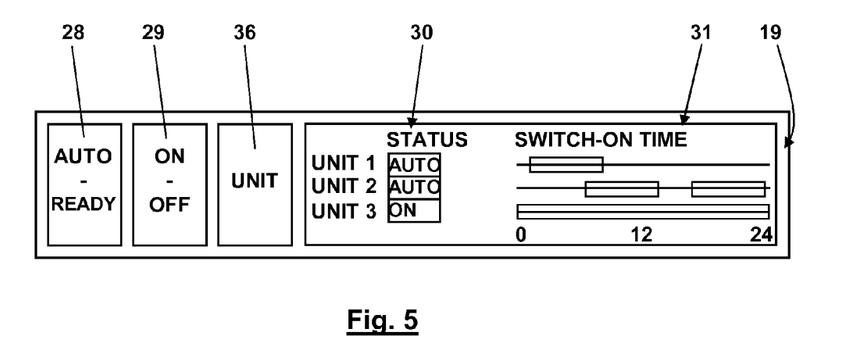
FIG. 5 shows a further embodiment of an input device for use in the method according to FIG. 2.

FIG. 5 shows the front of the input device 19 according to FIG. 1, wherein this input device 19 is also configured to handle a third consumer or unit. Via a unit selector switch 36 the consumer may be selected for which a user demand or advance notification is entered. The selected switch-on time is indicated for each unit separately by the switch-on time display 31. The form of this display is basically the same one as in FIG. 4 but differs from that one in FIG. 3 designed as a linear time bar.

Figure 6:
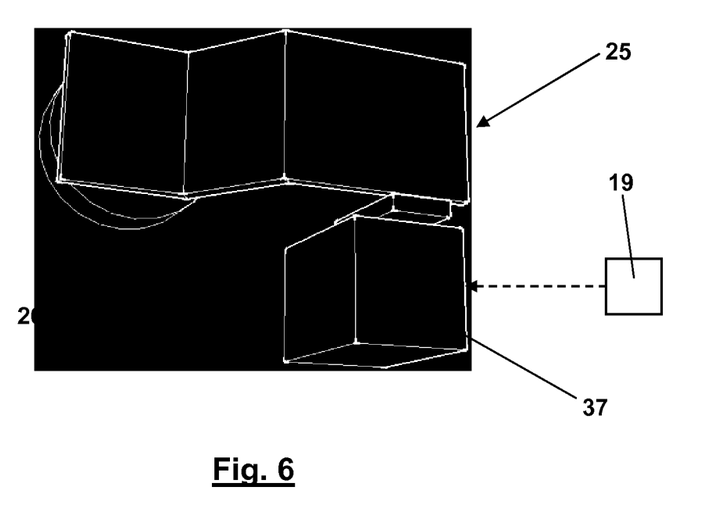
FIG. 6 shows a controllable actuation element mounted relative to a switch-on button of an individual consumer.

FIG. 6, at an enlarged scale, depicts one of the actuation elements 25 for a switch-on button 26 of a consumer according to FIG. 1. The actuation element 25 comprises a drive 37 which is controlled by the input device 19 here. The drive 37 may be an electric motor or a simple pre-loadable spring-loading mechanism. Upon triggering of its operation, i.e. by starting the motor drive or releasing the pre-loaded spring-loading mechanism, the actuation element 25 presses the switch-on button 26 at a point in time determined by the central controller 11 of FIG. 1 in order to, for example, start a washing machine which was pre-programmed by the user. During the execution of the program of the washing machine, the controller 11 may then purposefully limit the supply of electric power via the respective connector, like for example temporarily during a heating phase, in order to comply with its plan for apportioning electric power to the individual consumers.

Figure 7:
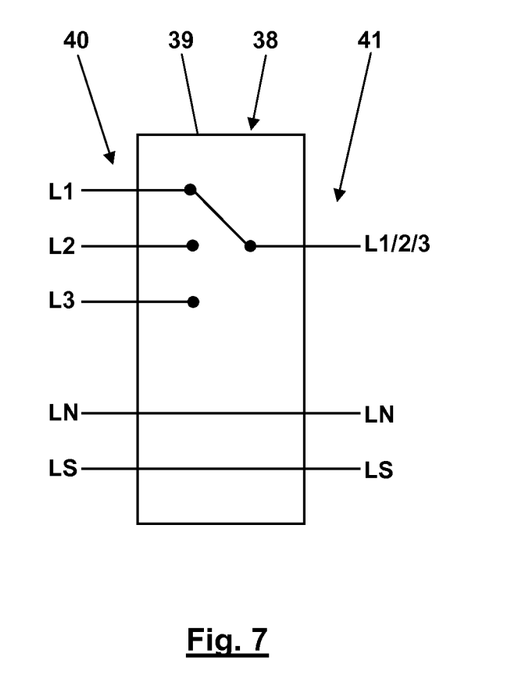
FIG. 7 shows an adaptor comprising a three-phase AC power input and a single-phase AC power output.

FIG. 7 shows an individual connector 38 for an individual consumer which can be controlled by the central controller 11 according to FIG. 1 and which comprises all features as they have already been explained with regard to the single connectors 14 to 17 of FIG. 1. Further, the single connector 38 has the function of an adaptor 39 between a three-phase AC power input 40 and a single-phase AC power output 41. The phase line of the single-phase AC power output 41 is selectively switchable to one of the phase lines of the three-phase AC power input 40. Thus, the central controller may, by connecting a single-phase consumer to a certain phase of a three-phase AC current which is provided by the power generator, or by switching between different phases, avoid unbalanced loads which, in an extreme case, may have the result that electric power is fed into the public power grid 10 out of the local power grid 1 of FIG. 1 via one phase, while at the same time the local power grid 1 imports electric power from the public power grid 10 via another phase.

The invention claimed is:

1. A method of optimizing a chronological development of consumption of electric power by a group of different consumers located within a local power grid with regard to a supply of electric power including electric power from at least one solar power generator located within the local power grid, comprising:
   measuring a consumption of electric power by each individual consumer of the group of different consumers at a sample rate of at least 0.1 Hz;
   determining characteristic time curves of the consumption of electric power by the individual consumers based on the measured consumptions;
   making a prognosis of a chronological development of the supply of electric power from the at least one solar power generator for a future period of time;
   making a plan for apportioning electric power to the individual consumers within the future period of time based on the determined characteristic time curves of the consumption of electric power by the individual consumers and adapted to the prognosis and further based on at least one user goal setting comprising maximizing a local consumption by the consumers within the local power grid of electric power generated by the at least one solar power generator; and
   apportioning, via a central controller, electric power to the individual consumers according to the plan within the future period of time, wherein the electric power is apportioned to the individual consumers according to the plan within the future period of time at a clock rate of at least 0.1 Hz, wherein the electric power is apportioned to two or more selected individual consumers, wherein the apportionment of electric power to a first of the selected individual consumers takes place in gaps of the consumption by a second of the selected individual consumers such that the consumption of the first and second individual consumer is mutually exclusive, and wherein at least one of the selected individual consumers comprises an oscillating consumption of electric power.

2. The method of claim 1, wherein the consumption of electric power by the individual consumers is measured at the sample rate of one of at least 1 Hz, at least 10 Hz, at least 100 Hz or at least 1 kHz.

3. The method of claim 1, wherein the electric power is apportioned to the individual consumers according to the plan within the future period of time at the clock rate of one of at least 1 Hz, at least 10 Hz or at least 100 Hz.

4. The method of claim 1, wherein measuring a consumption of electric power comprises one or more steps selected from the group consisting of:
   measuring the consumption of electric power by at least one individual consumer at its single connector; and
   measuring a sum of the consumption of electric power by a plurality of individual consumers by means of an electric meter.

5. The method of claim 1, wherein the plan for apportioning electric power to the individual consumers is continuously updated based on an actual supply of electric power from the at least one solar power generator and on an actual demand of electric power by the individual consumers.

6. The method of claim 5, wherein updating the plan comprises at least one step selected from the group consisting of:
   considering further electric values of at least one individual consumer measured at its single connector; and
   considering further physical values of at least one individual consumer measured with sensors.

7. The method of claim 1, wherein apportioning electric power to the individual consumers comprises at least one step selected from the group consisting of:
   executing the apportioning via at least one switchable single connector associated with a single one of the individual consumers;
   limiting a maximum consumable electric power for at least one individual consumer;

limiting a maximum consumable electric power for at least one individual consumer by means of pulse width modulation;

accessing an interface of a controller of at least one individual consumer;

purposefully activating at least one individual consumer by means of an actuation element for a switch-on button of the individual consumer mounted to the individual consumer; and levelling the electric power consumed by at least one of the individual consumers over at least a part of the future period of time by limiting the maximum consumable electric power for the at least one individual consumer while substantially keeping the average electric power consumed by the least one individual consumers identical to the average power consumed without levelling.

8. The method of claim 1, wherein making the plan for apportioning electric power to the individual consumers within the future period of time comprises at least one step selected from the group consisting of:

considering user-defined advance notifications of an operation of at least one individual consumer within the future period of time;

considering different priorities of the individual consumers within the future period of time;

making and considering a basic consumption prognosis that corresponds to the characteristic time curve of a consumption of electric power by all those consumers whose consumption of electric power is not limited;

making and considering a further prognosis of a chronological development of conditions of importing electric power from a public power grid for the future period of time;

making and considering a further prognosis of a chronological development of conditions of feeding electric power into the public power grid for the future period of time;

making and considering a further prognosis of a chronological development of conditions of buffering electric power in a storage for electric energy for the future period of time;

making and considering a further prognosis of a chronological development of conditions of transferring electric power to and from at least one other group consisting of at least one of consumers and power generators for the future period of time;

making and considering a further prognosis of a chronological development of conditions of an achievement of a same result in an alternative way by another existing consumer or power generator or another existing device for the future period of time;

making and considering a further prognosis of a chronological development of conditions of a provision of heat in an alternative way by another existing consumer or power generator or another existing device for the future period of time;

determining potential effects of an achievement of a same result in an alternative way under at least one of other conditions of the import of electric power from the public power grid and other conditions of the feeding of electric power into the public power grid; and determining potential effects of an achievement of a provision of electric power to the individual consumers according to the plan in an alternative way under at least one of other conditions of the import of electric power from the public power grid and other conditions of the feeding of electric power into the public power grid.

9. The method of claim 1, wherein the plan includes distributing the supply of electric power from a three-phase supply to individual single-phase consumers over the three phases of the three-phase supply.

10. The method of claim 1, wherein the individual consumers are surveyed for proper function by comparing their actual time curves of the consumption of electric power with their characteristic time curves of the consumption of electric power.

11. The method of claim 1, wherein the prognosis of the chronological development of the supply of electric power from the at least one solar power generator is made on the basis of weather forecasts.

12. An apparatus for optimizing the chronological development of consumption of electric power by a group of different consumers located within a local power grid with regard to a supply of electric power including electric power from at least one solar power generator located within the local power grid, the apparatus comprising:

measurement devices being configured to measure the consumption of electric power by each individual consumer of the group of different consumers at a sample rate of at least 0.1 Hz; and a central controller configured to apportion electric power to the individual consumers, the central controller being configured to:

determine characteristic time curves of the consumption of electric power by the individual consumers based on the measured consumptions, make a prognosis of a chronological development of the supply of electric power from the at least one solar power generator for a future period of time, make a plan for apportioning electric power to the individual consumers within the future period of time based on the characteristic time curves of the consumption of electric power by the individual consumers and adapted to the prognosis and further based on user goal settings comprising one or more of:

maximizing a local consumption by the consumers within the local power grid of electric power generated by the at least one solar power generator; or minimizing or limiting a consumption of electric power within the local power grid supplied by the public power grid;

and apportion electric power to the individual consumers according to the plan within the future period of time, wherein the central controller is configured to adjust the apportionment of electric power to the individual consumers according to the plan at a clock rate of at least 0.1 Hz, wherein the electric power is apportioned to two or more selected individual consumers, wherein the apportionment of electric power to a first of the selected individual consumers takes place in gaps of the consumption by a second of the selected individual consumers such that the consumption of the first and second individual consumer is mutually exclusive, and wherein at least one of the selected individual consumers comprises an oscillating consumption of electric power.

13. The apparatus of claim 12, wherein the measurement devices are configured to measure the consumption of electric power by the individual consumers at the sample rate of one of at least 1 Hz, at least 10 Hz, at least 100 Hz or at least 1 kHz.

14. The apparatus of claim 12, wherein the central controller is configured to adjust the apportionment of electric power to the individual consumers according to the plan at the clock rate of one of at least 1 Hz, at least 10 Hz or at least 100 Hz.

15. The apparatus of claim 12, wherein the measurement devices are selected from the group consisting of:
an electric meter configured to measure a sum of consumption of electric power by a plurality of individual consumers;
measurement devices configured to measure the consumption of electric power by at least one individual consumer at its single connector;
measurement devices configured to measure further electric values of at least one individual consumer from its single connector;
sensors to be mounted to at least one of the individual consumers and configured to measure further physical values of the consumer measurement devices; and
measurement devices configured to measures the actual supply of electric power from the at least one solar power generator.

16. The apparatus of claim 12, further comprising at least one switchable single connector via which the central controller apportions electric power to a single one of the individual consumers, wherein the at least single connector comprises at least one feature selected from the group consisting of:
the at least one switchable single connector is switchable at a high frequency to limit the maximum power which may be consumed by the single individual consumer;
the at least one switchable single connector is switchable to limit the maximum power which may be consumed by the single individual consumer by means of pulse width modulation; and
the at least one single connector comprises a communication interface for communicating wirelessly or via Power Line Communication.

17. The apparatus of claim 12, further comprising at least one controllable actuation element configured to be mounted to one of the individual consumers for pressing its switch-on button.

18. The apparatus of claim 12, wherein the central controller comprises an interface configured to enable communication of the central controller with at least one interface of a controller of one of the individual consumers.

19. The apparatus of claim 12, further comprising at least one adaptor comprising a three-phase AC power input and at least one single-phase AC power output that is selectively switchable by the controller to different phases of the AC power input.

20. The apparatus of claim 12, wherein the central controller further comprises at least one interface selected from the group consisting of:
an interface configured to access the internet;
an interface configured to access an external data base;
an interface configured to receive weather forecasts;
an interface configured to receive conditions of importing electric power from a public power grid;
an interface configured to receive conditions of buffering electric power in a storage device for electric energy; and
an interface configured to interconnect with at least one further similar apparatus and to exchange prognoses of chronological developments of at least one of the supply and of the consumption of electric power for the future period of time with the at least one further similar apparatus via this interface.

21. The apparatus of claim 12, further comprising at least one display unit configured to display at least one of the plan for apportioning electric power to the individual consumers and an availability of electric power from the at least one solar power generator which is not yet used according to the plan.

22. The apparatus of claim 12, combined with the group of different consumers and the at least one solar power generator in the local power grid, wherein the local power grid is connected to a public power grid via a bidirectional grid connection point which is selected from the group consisting of:
a household connection point;
a distribution point in a public power grid;
a transformer in a local or public power grid.

23. A method of optimizing a chronological development of consumption of electric power by a group of different consumers located within a local power grid with regard to a supply of electric power by different power sources including at least one solar power generator located within the local power grid and at least one of a storage for electric energy located within the local power grid and a public power grid which allow for a bi-directional exchange of electric power, comprising:
measuring a consumption of electric power by each individual consumer of the group of different consumers;
determining characteristic time curves of the consumption of electric power by the individual consumers based on the measured consumptions;
making a prognosis of a chronological development of the supply of electric power from the at least one solar power generator for a future period of time;
making a plan for apportioning electric power to the individual consumers within the future period of time based on:
the prognosis,
the characteristic time curves of the consumption of electric power by the individual consumers,
the conditions of the bi-directional exchange of electric power with the at least one of the storage for electric energy and the public power grid, and
at least one user goal setting set by a user of the consumers and resulting in different weightings of at least one of consumption of electric power by the different consumers and supply of electric power by the different power sources within the future period of time;
apportioning, via a central controller, electric power to the individual consumers according to the plan within the future period of time, wherein the apportionment of electric power to the individual consumers according to the plan is adjusted at a clock rate of at least 0.1 Hz, wherein the electric power is apportioned to two or more selected individual consumers, wherein the apportionment of electric power to a first of the selected individual consumers takes place in gaps of the consumption by a second of the selected individual consumers such that the consumption of the first and second individual consumer is mutually exclusive, and wherein at least one of the selected individual consumers comprises an oscillating consumption of electric power; and updating the plan based on an actual supply of electric power by the at least one solar power generator and an actual consumption of electric power by the individual consumers.

24. The method of claim 23, wherein the different weightings include different weighting factors selected from the group consisting of:
different weighting factors for at least one of the electric power to be consumed by the different individual consumers according to the plan and the cost of this electric power in the future period of time;
different weighting factors for the electric power to be consumed and the cost of this electric power which vary in the future period of time;
different weighting factors for the electric power to be consumed and the cost of this electric power which are a function of time; and
different weighting factors for at least one of the electric power to be consumed when supplied by the different power sources according to the plan and the cost of this electric power in the future period of time.

25. The method of claim 23, wherein the at least one user goal setting is selected from the group consisting of:
maximizing a local consumption of electric power generated by the at least one solar power generator;
minimizing or limiting cost of electric power consumed by the consumers;
minimizing or limiting a consumption of electric power supplied by the public power grid;
minimizing or limiting deviations of starting and ending points in time of an operation of a consumer from a user presetting; and
minimizing or limiting a deviation of a temperature adjusted my means of the consumers from a desired temperature within a certain interval of time within the future period of time.

26. The method of claim 24, wherein the weighting factors for simultaneously valid user goal settings are added up prior to their application, wherein the weighting factors for each of the simultaneously valid user goal settings further comprise a fixed weighting factor which corresponds to the relative importance of the user goal setting with regard to the other simultaneously valid user goal settings.

27. The method of claim 25, wherein a sum of at least one of a weighted consumed electric power and a sum of a weighted cost of the consumed electric power are limited or minimized when making the plan for apportioning electric power to the individual consumers.

28. An apparatus for optimizing a temporal development of consumption of electric power by a group of different consumers located within a local power grid with regard to a supply of electric power by different power sources including at least one solar power generator located within the local power grid and at least one of a storage for electric energy located within the local power grid and a public power grid which allow for a bidirectional exchange of electric power, comprising a central controller configured to
measure a consumption of electric power by each individual consumer of the group of different consumers;
determine characteristic time curves of the consumption of electric power by the individual consumers based on the measured consumptions;
make a prognosis of a chronological development of the supply of electric power from the at least one solar power generator for a future period of time;
make a plan for apportioning electric power to the individual consumers within the future period of time based on:
the prognosis,
the characteristic time curves of the consumption of electric power by the individual consumers,
the conditions of the bi-directional exchange of electric power with the at least one of the storage for electric energy and the public power grid, and
at least one user goal setting set by a user of the consumers and resulting in different weightings of at least one of consumption of electric power by the different consumers and supply of electric power by the different power sources within the future period of time;
apportion electric power to the individual consumers according to the plan within the future period of time, wherein the apportionment of electric power to the individual consumers according to the plan is adjusted at a clock rate of at least 0.1 Hz, wherein the electric power is apportioned to two or more selected individual consumers, wherein the apportionment of electric power to a first of the selected individual consumers takes place in gaps of the consumption by a second of the selected individual consumers such that the consumption of the first and second individual consumer is mutually exclusive, and wherein at least one of the selected individual consumers comprises an oscillating consumption of electric power; and
update the plan based on an actual supply of electric power by the at least one solar power generator and an actual consumption of electric power by the individual consumers.

* * * * *